June 17, 1952 A. M. GUILLET 2,601,134
INTERCHANGEABLE ROLLER NECK FOR TEXTILE FLUTED ROLLS
Filed Jan. 10, 1949
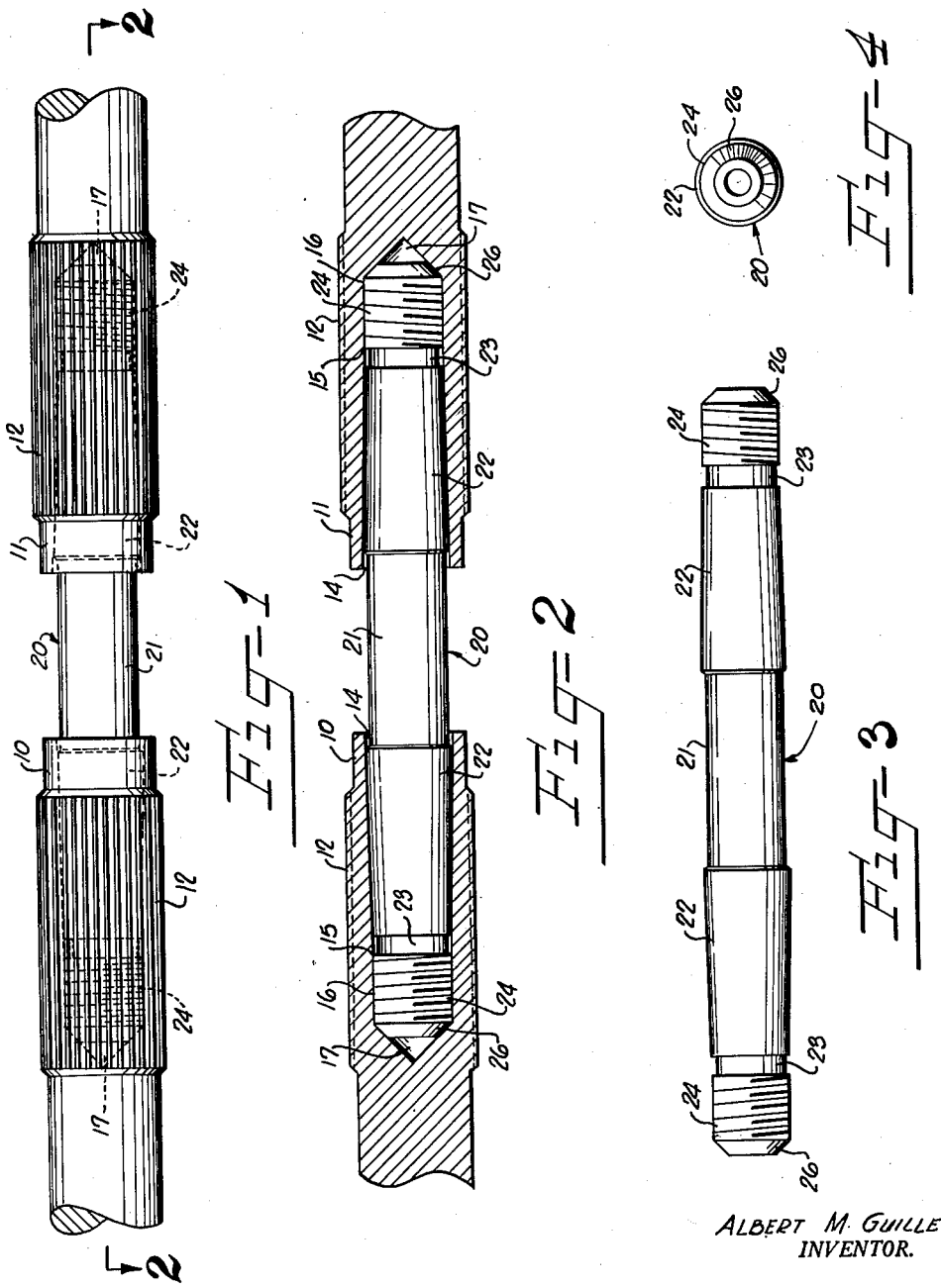
ALBERT M. GUILLET
INVENTOR.
BY
ATTORNEY.

Patented June 17, 1952

2,601,134

UNITED STATES PATENT OFFICE 2,601,134

INTERCHANGEABLE ROLLER NECK FOR TEXTILE FLUTED ROLLS

Albert M. Guillet, Charlotte, N. C.

Application January 10, 1949, Serial No. 70,101

2 Claims. (Cl. 19—141)

This invention relates to spinning machinery, and particularly to improved means for joining the sections of the rolls together by an improved roller neck, the medial portion of said roller neck being adapted to rest in a suitable roll stand.

This structure is an improvement over my prior patents numbered 1,659,261 of February 14, 1928, 1,808,813 of June 9, 1931, and 1,907,960 of May 9, 1933. In these prior patents various roller necks having tapered portions for fitting into the proximate ends of two pairs of rolls have been provided, but in the first-noted patent, the taper of the ends of the roller necks adjacent their threaded portions was too steep, which often resulted in bulging out or increasing of the diameter of the end fluted bosses on the sections of rolls. In the second-noted patent the shoulders were very steep and also had a tendency, when the roller necks were driven home to too great a degree, to result in spreading of the diameter of the rolls at each end.

In the last-noted patent this difficulty of spreading the rolls was overcome by providing a shoulder at the end of the tapered portions which was adapted to rest against an internal shoulder in the ends of the rolls and which limited the inward movement of the tapered portions relative to the rolls and therefore prevented swelling of the end bosses of the rolls. However, in the last-noted patent, the milling operation in milling out the ends of the rolls was quite an expensive operation, as the bores in the ends of the rolls extended not only through the first boss, but into the second boss from the end of the roll section.

In the present structure, I have eliminated all of the defects in the previously named patents, by providing a shorter roller neck having shorter tapered portions, but yet having very gentle tapers thereon with a threaded portion adapted to be threaded into the base of the bores in the roll sections. I have also provided a threaded bore in each roll section and a tapered bore in each roll section at the base of each threaded bore to limit movement of the roller necks into the threaded bores in the ends of the rollers to thus limit the relative movement between the two. Swelling is not imparted to the end bosses due to the fact that the bores are somewhat smaller than in my previous patents, and also, due to the fact that the bores do not extend into the restricted portion between the two end bosses of the rolls. I have thus prevented the weakening of the end portions of the roll which would occur in the last two noted patents.

It is therefore an object of this invention to provide a roller neck for connecting two rolls, wherein the proximate ends of the rolls are provided with tapered bores, and cylindrical bores communicating with said tapered bores. The diameter of each of the cylindrical bores is slightly less than the diameter of the tapered bores. The cylindrical bores are threaded after the tapered bores are milled so that the threaded cylindrical bores will have substantially the same diameter as the diameter of the tapered bore immediately adjacent the same. The roller neck is provided with tapered end portions adjacent the ends thereof adapted to fit in the tapered bores in said rolls and also has threaded end portions adapted to threadably engage the threaded cylindrical bores in said rolls.

Some of the objects of the invention having been stated, other objects will appear as the description proceeds, when taken in connection with the accompanying drawings, in which—

Figure 1 is an elevation of the proximate ends of two fluted rolls and the improved roller neck joining the same;

Figure 2 is a longitudinal sectional plan view taken along the line 2—2 in Figure 1;

Figure 3 is an elevation of the roller neck disassociated from the rolls;

Figure 4 is an end view of the roller neck.

Referring more specifically to the drawings, the numerals 10 and 11 show two proximate fluted rolls each of which has a plurality of spaced bosses 12 thereon only the endmost of which are shown. The ends of these rolls are bored with a tapering bore 14 which extends from the end of the rolls inwardly to a point indicated at 15, and then from the point 15, is formed a straight bore 16 having the same dimensions throughout, the extreme inner end of this bore being tapered as at 17 due to the shape of the boring bit. A roller neck 20 is then provided having a bearing portion 21 and a tapered portion 22 on each side of the bearing portion with a reduced portion as at 23, and then having a threaded portion 24 of the same diameter as the tapered portion of the roller neck has at its smallest end.

The extreme inner end of the bore in the end of the roller is threaded to receive the threaded portion 24 of the roller neck and when the rolls are rotated relative to the roller neck to drive the threaded portions 24 home, a tapered shouldered portion 26 on each end of the roller neck will fit against the tapered bore 17 to thus limit longitudinal relative movement between the roller neck and the roll.

It is thus seen that this shoulder 26 limits the relative movement between the end of the roller neck and the boss, to thus regulate the distance apart of the proximate ends of the rolls 10 and 11. The extreme inner end of each bore, as indicated at 17, stops short of the other end of the fluted boss 12 and thus does not weaken the restricted portion of the roll appearing between the outermost boss on the roll and the next adjacent boss, which is not shown.

It is therefore seen that I have provided an improved roller neck for joining the ends of fluted rolls together which does not weaken the rolls and which prevents any spreading of the end fluted bosses of the roll due to the peculiar structure and methods employed.

In the drawings and specifiction there has been set forth a preferred embodiment of the invention, and although specific terms are employed, they are used in a generic and descriptive sense only, and not for purposes of limitation, the scope of the invention being defined in the claims.

I claim:

1. The combination of a detachable and interchangeable roller neck and a pair of textile rolls, said rolls having tapered bores in their proximate ends and having cylindrical bores communicating with the smaller innermost ends of the tapered bores, said roller neck having a reduced medially disposed cylindrical journal portion and having tapered portions joined to each end of the journal portion and being of larger diameter than the diameter of the journal portion at their junction points and extending into the tapered bores in the ends of adjoining rolls, the proximate ends of the two rolls having fluted bosses thereon and the tapered bores and cylindrical bores stopping short of the ends of the said fluted bosses which are remote from the proximate ends of the rolls, the cylindrical bores in the rolls being of the same diameter throughout and of substantially the same diameter as the diameter of the smaller ends of the tapered portions of the roller neck and the innermost ends of the cylindrical bores in the rolls being threaded and the roller neck being threaded adjacent each end thereof to threadably engage the threaded cylindrical bores, said rolls having second tapered bores in their proximate ends communicating with said cylindrical bores and the ends of the roller neck each having a mating shoulder portion to fit against the respective second tapered bores in each of said rolls.

2. The combination of a detachable and interchangeable roller neck and two textile rolls having spaced fluted bosses thereon, said roller neck comprising a medially disposed cylindrical journal portion having tapered portions extending from each end thereof, said rolls having tapered bores in their proximate ends which extend substantially half the length of the fluted bosses on the proximate ends thereof and each roll having a cylindrical bore extending from the inner end of the tapered bore further inwardly into the rolls but stopping short of the end of said last-named fluted boss, the cylindrical bores being threaded and said roller neck being threaded adjacent the ends thereof to threadably engage the threaded portions of the cylindrical bores in the ends of the rolls, the proximate ends of the rolls also having second tapered bores communicating with the cylindrical bores and the ends of the roller neck being tapered to fit into the second tapered bores.

ALBERT M. GUILLET.

REFERENCES CITED

The following references are of record in the file of this patent:

UNITED STATES PATENTS

| Number | Name | Date |
|---|---|---|
| 2,251,031 | Bozeman, Jr. | July 29, 1941 |